Patented Aug. 25, 1925.

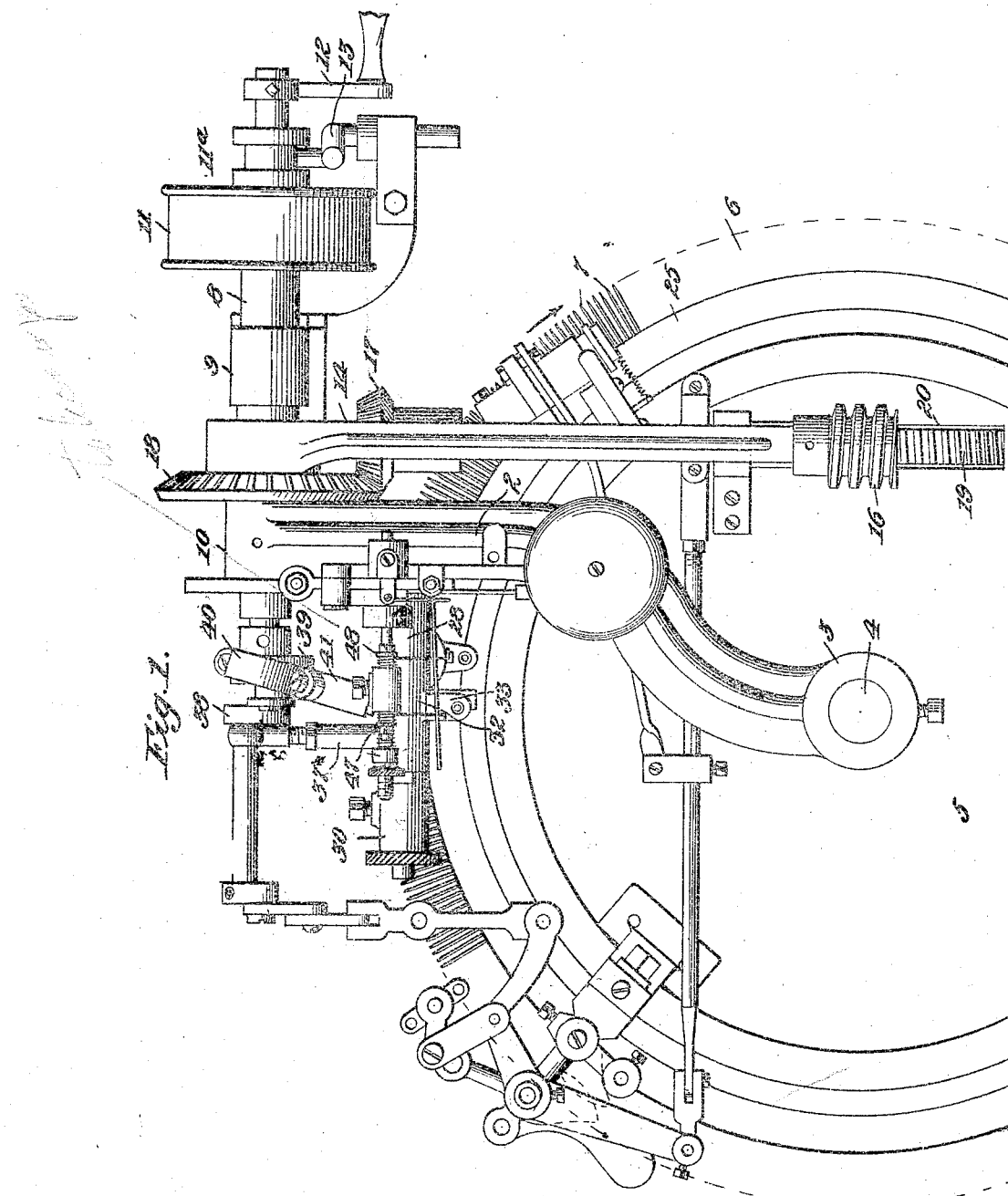

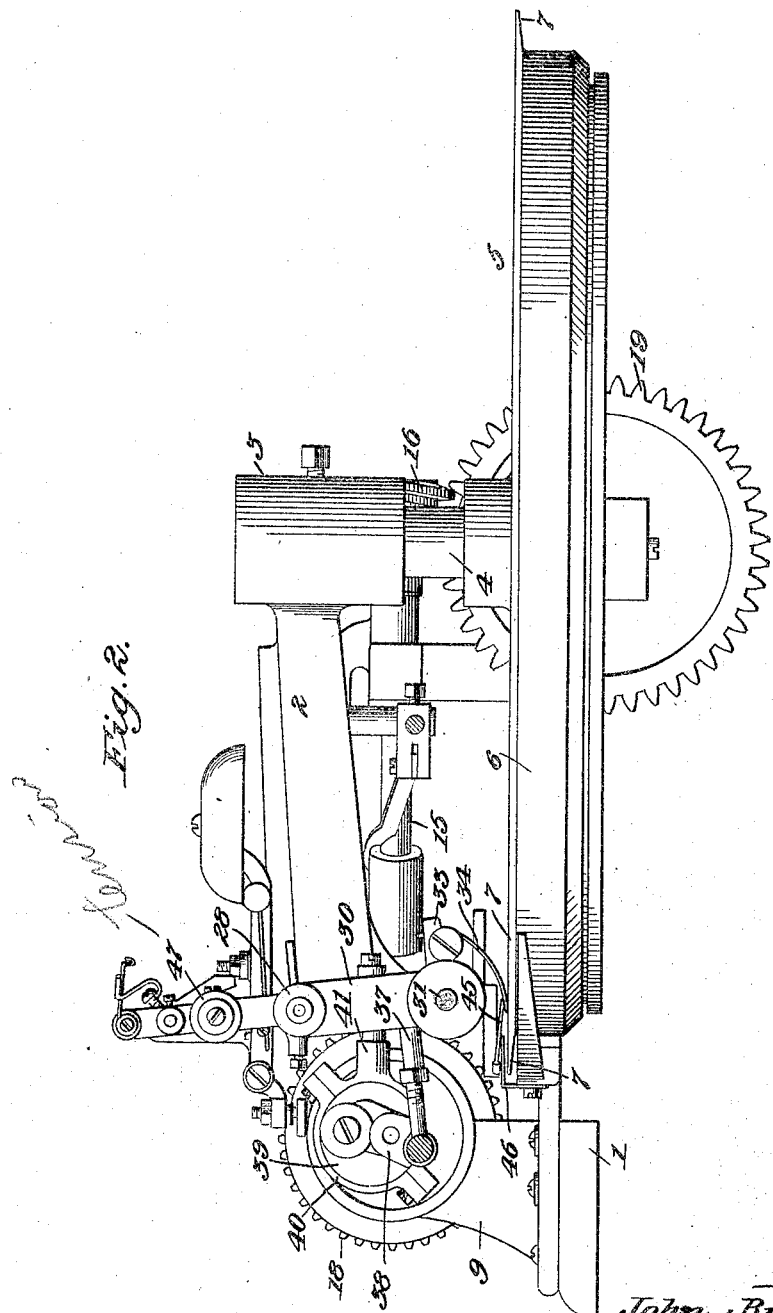

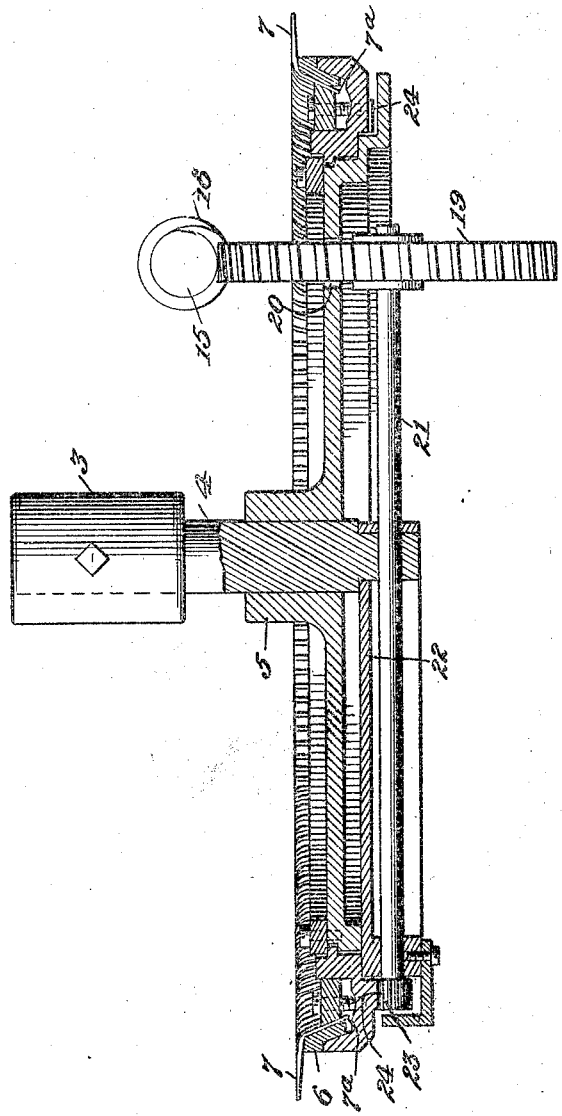

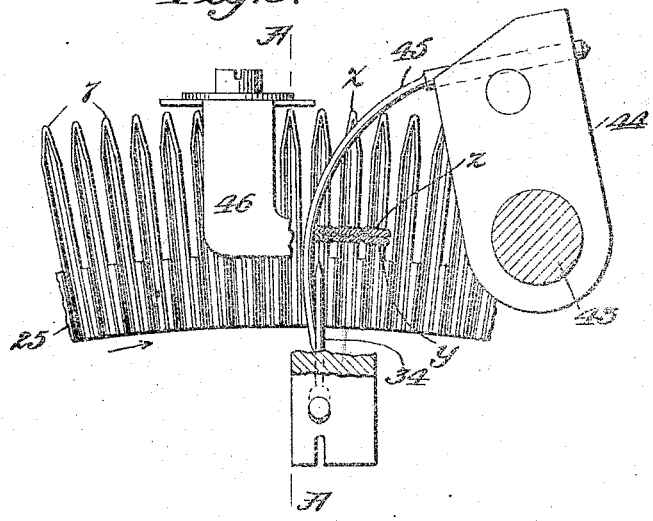
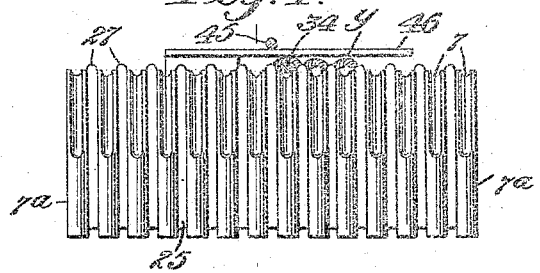
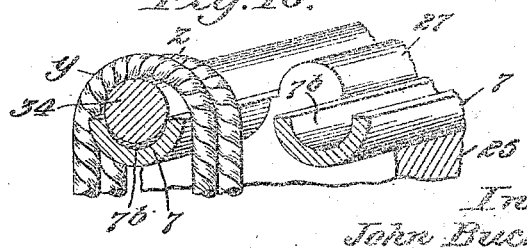

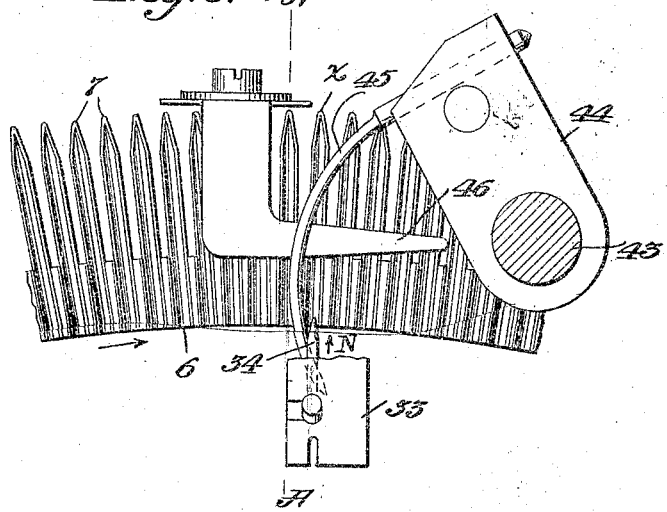
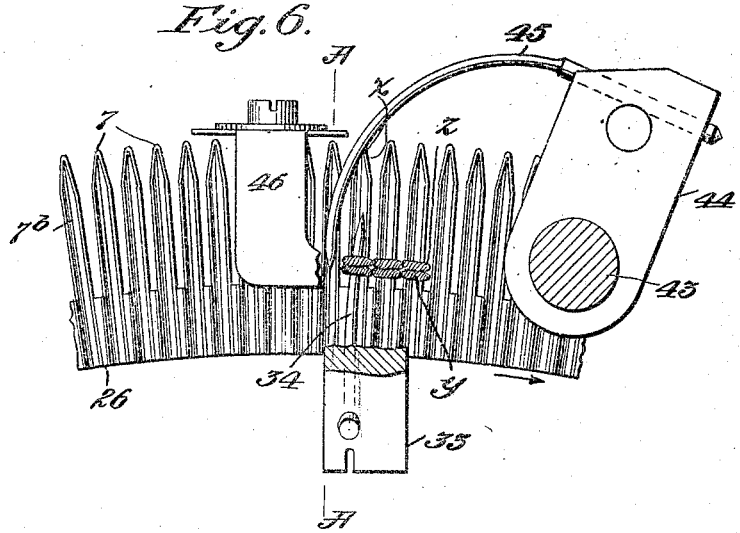

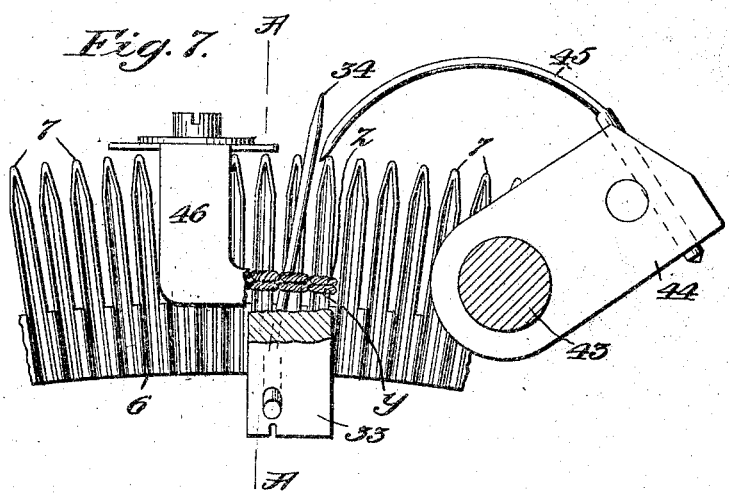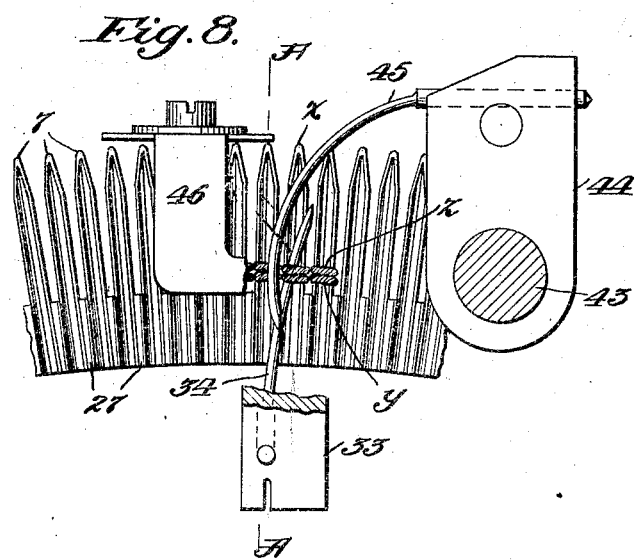

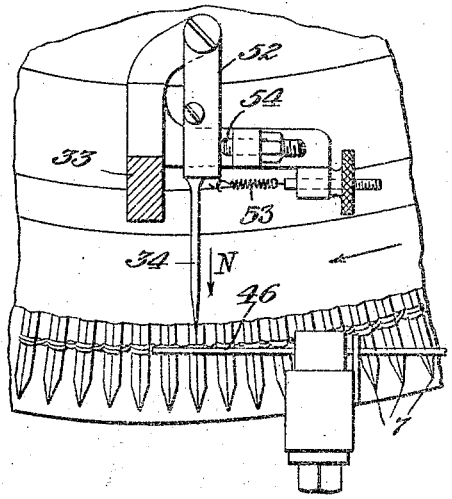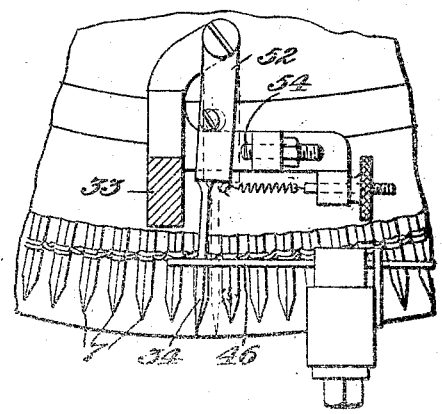

1,551,188

UNITED STATES PATENT OFFICE.

JOHN BUCKREUS, OF HARTFORD, WISCONSIN, ASSIGNOR, BY MESNE ASSIGNMENTS, TO POPE MACHINE COMPANY, OF KANKAKEE, ILLINOIS, A CORPORATION OF ILLINOIS.

APPARATUS FOR UNITING KNIT FABRICS.

Application filed July 23, 1921. Serial No. 487,037.

*To all whom it may concern:*

Be it known that I, JOHN BUCKREUS, a citizen of the United States, residing at Hartford, in the county of Washington and State of Wisconsin, have invented certain new and useful Improvements in Apparatus for Uniting Knit Fabrics, of which the following is a specification, reference being had therein to the accompanying drawing.

This invention relates to apparatus for uniting knit fabrics.

The object of the invention is to provide a practical, efficient, and economical structure for uniting or connecting the immediate edges of looped portions of fabrics (particularly hosiery).

The type of machine herein contemplated includes, in general, a so-called dial or pin-carrying ring on which are radially disposed a series of impaling pins or points, these each being provided with a longitudinal groove in its upper portion; a stitch-forming mechanism associated with the dial and including a sewing or thread-needle adapted to have a reciprocatory movement in relation to each of said impaling pins or points and successively to enter the groove in each point so as properly to be guided thereby into the loops or stitches of the fabric on the impaling pin or point so that the needle and, thus, the thread which it carries, may be carried through the two fabric loops or stitches sustained by the point; and means for effecting continuous rotary movement of the dial for successively positioning each of the impaling pins or points for engagement therewith of the thread-needle. While this type of structure, generally speaking, has long been in use for uniting knit-fabrics; nevertheless, the present machine involves a novel feature which effects a function not heretofore contemplated or utilized in this kind of structure and whereby, while the hosiery is actually in motion on the constantly-moving dial, the sewing of the edges or looped portions thereof may be accomplished without either bringing the hosiery-sustaining dial temporarily to a condition of rest (as is the usual practice) or bodily effecting traveling movement of the sewing-needle while registering with the groove in the impaling-point so as to travel therewith as the dial itself rotates continuously. The feature of prime importance in connection with my inventive-concept is, first, the continuous, uninterrupted, and steady rotation of the pin-carrying ring—and, thus, of the ring of impaling pins—and, secondly, the coactive relating of each grooved point or pin successively to the sewing-needle without having to shift the needle bodily so that it will travel with the point while it (the needle) is in the loops or stitches of the fabric.

In the uniting of edges of adjacent portions of fabrics like hosiery, the prior practice—very generally followed, I am informed—involved either of two procedures: One procedure contemplated an intermittent rotary movement of the dial or ring of impaling points or pins, the dial having a period of rest at a certain stage of each reciprocatory movement of the thread-needle to permit the needle to enter the groove of each impaling pin or point and be thereby guided, following which it penetrated and remained in the two loops of the fabric-edges while the uniting or sewing operation was being accomplished. The other procedure contemplated effecting a continuous rotary movement of the dial—and, thus, of the ring of impaling pins or points—and a lateral shifting movement, bodily, of the threaded-needle during its cycle of reciprocatory movement so that it would remain in or operatively related to the groove of the pin or point—and, thus, be held within the loops being united—until the completion of the effective portion of the stitching-operation.

Recognized disadvantages of and objections to the first-mentioned practice—and, in consequence, to the type of machine used in connection therewith—eventually led to the development and wide-spread use of the second. But experience has shown that even the second practice involves mechanical and functional objections and disadvantages; and, moreover, the mechanism utilized in connection therewith must include means for effecting the lateral shifting, bodily, of the thread-needle and in very accurate timed relation to the movement of the dial and, thus, of each of the impaling pins or points—in order to inaugurate and preserve the required relation between the thread-needle and the grooved point as such point continues in its movement with the dial while the needle is engaged therewith and is projecting through the two loops of the fabric being united. One of the serious disadvantages of and objections to the first-mentioned practice is that the intermittent, unsteady, and jerky movement of the pin-carrying member developed a strain upon the operator, tending to make her nervous, and ultimately resulted in a serious eye-strain. One of the disadvantages of and objections to the second practice is that the timed shifting of the needle, bodily, so as momentarily to travel with the dial as it rotates on its axis, is not only difficult to accomplish but difficult to maintain accurately, and, besides, by reason of the accumulation of lint, dirt, etc., on or between the movable parts, their action is either retarded or entirely prevented and, then, the machine fails to function properly.

The present invention is predicated upon the discovery (following long-continued observation of the operation of these two types of machines), that the continuous or steady motion of the dial—which is unquestionably a feature of advantage over the aforementioned intermittingly-operated dial—could be utilized without necessity of simultaneously effecting the shifting of the needle bodily and laterally to correspond with the continued movement of each point during the uninterrupted rotary travel of the dial; the proper coaction between and guided engagement of the thread or sewing needle and the grooved impaling pin or point being accomplishd, with certainty and ease, by causing the grooved point (with other adjunctive instrumentalities hereinafter to be specified) to deform or otherwise momentarily change the condition of the needle, or the position of its point only, while in coaction with the impaling pin. In other words, the necessary coactive relation between the needle and the impaling point is maintained in a manner not heretofore suggested or, as far as I am aware, even assumed to be possible. Theoretically, proper practice would seem to dictate that either the needle should be oscillated bodily so as to travel momentarily with the continuously-rotating dial, or that the rotation of the dial should be arrested momentarily in order that, during its period of rest, the needle could be reciprocated into and out of coaction with each grooved point or pin. Among all manufacturers and inventors who have heretofore worked in this art, as I am advised, this theory of operation and the necessity of operating the parts in the one way explained, or in the other, have controlled such manufacturers and inventors, with the result that, without exception (as far as I am informed), all machines proposed or built have operated on this theory and resorted to either of the two types of practice above set forth.

The present inventive-concept is, therefore, based upon a practice which is contrary to what, as already pointed out, has heretofore been regarded as the proper one; and is founded on the discovery that the sewing or thread needle may be successfully, effectually and and accurately maintained in proper relation to the guiding-groove in each impaling pin without resorting to a bodily shifting movement of the needle in the general direction of the rotative movement of the pin, notwithstanding the fact that it contemplates the use of the continuously-rotating dial. That is to say, such continuous rotation of the dial has really been utilized to perform a new function, namely, to move the parts so as to deform or operate the sewing-needle (while it is projecting through the loops or stitches of the fabric being united) in such a manner that the required relation initially established between the grooved impaling-pin and the sewing-needle is maintained until the looping operation on each two loops being united is completed, or practically finished. My invention, therefore, contemplates, (1) effecting a reciprocatory cycle of movement of the thread-needle in respect to each grooved point; (2) the steady and continuous rotation of the pin-carrying dial whereon the adjacent loops of two portions of fabric to be united are carried; and (3) the utilization of an instrumentality or means for holding the needle in or related to the guiding groove during its effective cycle of reciprocation into, through, and out of the loops impaled on the point. These instrumentalities may be, (1) the two loops themselves of that portion of the fabric which is on the pin or point, or (2) the stitch-forming thread or threads as the same are being produced to unite the loops, such instrumentalities being adapted to maintain effective coaction between the sewing-needle and the grooved loop-sustaining point for such part of the cycle of movement of the needle as it is essential to maintain it in such coactive relation to the grooved point on which the loops of the fabric being united are impaled.

By reason of this development in the art, I am able to avail myself of all of the practical advantages of the continuously-rotating or so-called "steady-motion" dial of a looping machine and yet avoid the objectionable use of the laterally-oscillating sewing-needle. In consequence, a machine characterized by my invention is caused to operate (to perform its required office) not only with greater efficiency than either of the two types of machines heretofore in use; but, all things being equal, with greater speed of operation. The importance of the feature of efficiency, here contemplated, is that certainty of action insures that each and every set of loops shall be united so that no "drop stitches" may result; hence, by my new procedure, the production of "seconds" by the looping-operation is avoided or, at least, is reduced to a minimum, and without the requirement of any more skill on the part of the operator, or any more attention on her part to the machine, than heretofore.

While I have hereinabove mentioned the primary objects of the invention as contemplating the overcoming of objections to former types of machines and methods of uniting adjacent edges of fabric; nevertheless, it is to be understood—in fact it will be apparent from what is hereinafter disclosed—that there are other equally important, as well as subsidiary, objects present in my invention.

In order that the invention may be more readily understood by those skilled in the art, I have illustrated a preferred embodiment of my inventive-concept in the accompanying drawings; but, it will be understood that illustration of these is to be regarded as merely exemplifying practical structures which may be employed, it being equally obvious that the invention is susceptible of other embodiments and utilizations and, also, that even these embodiments and utilizations are capable of a wide range of modification and variation without departing from the spirit of the invention or sacrificing any of its salient or underlying features.

In these drawings:

Figure 1 is a fragmentary view, in plan, of a looping machine or so-called "looper", with my invention embodied therein;

Fig. 2 is a view in elevation (and partly in section) thereof and showing a thread or sewing needle in coacting relation with an impaling pin or point on a continuously-rotating dial, the means for effecting the steady motion or continuous rotation of the dial being also therein shown;

Fig. 3 is a fragmentary view, in detail, showing a part of the dial-rotating mechanism;

Fig. 4 is a similar view showing, on an enlarged scale, a section of the pin-carrying ring;

Fig. 5 is a fragmentary view (on an enlarged scale and in which certain parts are broken away) and showing, particularly, several of the impaling pins or points (much enlarged) and with the stitch-forming needles shown as in one of the positions which they occupy during their cycle of movement for the stich-forming operation; the sewing-needle having just registered with the groove of one of the impaling-points preparatory to penetrating two loops (not shown) impaled on the point; the sewing-threads being omitted to preclude confusion or obscurity of the parts illustrated; the line A—A indicating the relative position of that impaling-point which is next adjacent to the one with which the sewing-needle is registering; and the arrows indicating, respectively, the direction of rotation of the pin-carrying dial and the direction of movement of the sewing-needle;

Figs. 6 to 9, inclusive, are views similar to Fig. 5, but showing the parts in the different positions which they occupy during the progress of the stitch-forming operation—Fig. 6 illustrating the dial as slightly advanced beyond the position shown in Fig. 5, as will be seen, by comparing the position of the pin, marked X (being the one in action) with the line A—A—the stitch-forming needle having penetrated the two fabric-loops impaled on the grooved point and been somewhat deformed thereby; Fig. 7 showing the sewing-needle practically at the extremity of its outward movement and indicating the deformation or bend thereof as being now located nearer the base of the needle; Fig. 8 showing the sewing-needle as somewhat retracted preparatory to withdrawing it from the loops and as having again assumed a curved form due to the action of the fabric-loops in functioning to hold the needle in the grooved point; and Fig. 9 showing the sewing-needle as entirely withdrawn from the loops which it had been sewing together and as straightened out in a normal condition and ready to penetrate loops on the next succeeding point, such point being in the meantime positioned, by the continuous rotation of the dial, into registering position with the sewing-needle;

Fig. 10 is a fragmentary view, in perspective and partly in section, of two of the impaling-pins, with loops on one of them, and a needle extending through the loops; and Figs. 11 and 12 are fragmentary views, in plan and partly in section, of a modified form of structure, the needle (in this instance) being shown as practically undeformable but adapted to have its outer extremity swung on a vertical axis by reason of its engagement with the fabric-loops on the points and as the dial continues its rotary movement.

*Pin-carrying dial.*—The reference-character 1 indicates a stationary base or bed-plate of a standard type of hosiery-looping machine. Formed with or attached to the bed-plate 1 and upstanding and projecting therefrom is an arm 2 to sustain a bearing-head 3 in which a vertical shaft 4 is journaled. The shaft is secured to a relatively stationary disk or dial-plate 5 for supporting a pin-carrying ring or dial 6 provided with a series of radially-disposed, outwardly-projecting impaling-pins or points 7.

As in the usual practice, two loops Y and Z of adjacent edges or portions of the fabric to be united are manually placed on each impaling-pin in the customary manner. The pins or points are, in this instance, shown considerably magnified and of a size larger even than those on an 8-point dial; but it is to be understood that, for finer gaged fabric, the points or pins 7 will be of smaller size and closer together, all as is well understood by those skilled in the art.

*Dial-rotating mechanism.*—The dial or pin-carrying ring 6 is designedly given a continuous, uniformly rotative, and steady movement. In other words, it is of the so-called "steady-motion" type. Mechanism for effecting continuous rotation of the dial is provided, and this will presently be herein described.

The machine includes a main drive-shaft 8, from which motion for various mechanisms and parts thereof is derived. This shaft is journaled in a bearing 9 upstanding from the bed-plate 1 and also in a bearing 10 formed in the rear extremity of the overhanging arm 2. The shaft 8 carries a driving-pulley 11 over which passes belting (not shown) communicating with a source of power, such as motor (not shown). At one extremity of the shaft is a crank 12 by which it may be manually operated. The drive-shaft 8 is adapted to be thrown into gear with the pulley 11 by a clutch-device 11$^a$ which is operated by a clutch-operating lever 13, preferably of the general character disclosed in United States application Serial No. 484,469, filed July 13, 1921 by Patrick P. La Montagne.

Extending forward from the main-shaft 8 and overhanging a portion of the pin-carrying dial is a shaft-sustaining arm or member 14 carrying a bearing. Journaled in this bearing and extending at right-angles to the main-shaft is a worm-shaft 15 carrying a worm-gear 16 at one of its ends and a bevel-gear 17 at its other end. This bevel-gear meshes with a corresponding bevel-gear 18 fast on the main-shaft 8. The worm-gear 16 meshes with a gear-wheel 19 which rotates in a slot 20 in the stationary disk 5. The gear-wheel is fast on a shaft 21 journaled in a bearing-piece 22 and carries at its opposite end a pinion 23 adapted to mesh with an annular rack 24 carried by the lower face of the pin-carrying dial 6. Thereby, the pin-carrying support is given a continuous relative feeding movement.

From the foregoing, it will be understood that the pin-carrying dial 6 derives continuous rotative movement directly from the driving-shaft 8 through the bevel-gears 17 and 18, the worm-shaft 15, the worm-gear 16, the gear-wheel 19, the shaft 21, the pinion 23, and the annular rack 24. In other words, when the pulley 11 is in driving connection with the main-shaft 8, the pin-carrying dial 6 will rotate continuously and steadily, and thereby successively present to the operator (sitting in front of the machine) the loop-carrying or impaling pins or points 7. These pins or points are preferably of very hard steel and have their base-portions 7$^a$ set into the "brass" 25 forming a component of the pin-carrying ring 6 and which is provided with a series of slots 26 in which the impaling pins or points are secured and in a plane somewhat below that of the radial shoulders 27 formed between the slots 26 in the "brass."

*Stitch-forming mechanism.*—Coacting with the impaling pins or points is a stitch-forming mechanism; and that herein disclosed is, in general, of the type shown and described in patent of G. Keyser No. 1,069,336, granted August 5, 1913. This stitch-forming mechanism includes the following components: Mounted on the overhanging arm 2 and extending transversely thereof is a bracket 28 having two pendant portions, one of which (30) is shown and in which is journaled a stub-shaft 31, on which is fast a two-arm member 32. In one arm 33 of the member 32 is a sewing-needle 34, shown (in this instance) as of curved form and as projecting in the longitudinal direction of the proximate impaling-points.

Another member (not shown) of the two-armed member 32 is connected (by a bolt not shown) to an actuating-arm 37, which in turn is connected, for actuation, to a crank 38 mounted on or connected to the extremity of the driving-shaft 8. Rotation of the driving-shaft operates the crank and this in turn, through the actuating-arm 37, operates the two-armed member 32 on its axis and thereby reciprocates the needle 34 for successive engagement with each of the impaling-points or pins 7 as the same are periodically presented thereto by the continuous rotary movement of the pin-carrying dial 6.

Fast on the driving-shaft 8, adjacent the crank 38, is an eccentric 39 which is encompassed by a strap 40 from which projects an integral arm 41 that is pivotally connected to a crank (not shown) fast on a vertical pintle 43 movably supported in the other of the pendant-portions of the bracket 28 and which carries a swinging-arm 44 at its lower end. In this arm 44 is mounted a looper-needle or looper 45 adapted to coact with the sewing-needle 34 to effect a formation of the stitch which successively sews together the two loops on each impaling-point.

Suitably secured on the stationary-disk and overlying the path of rotative travel of the impaling-pins is a stitch-receiving or "chaining" finger 46. This finger is arranged directly over and parallel to the path of the upper edges of the fabric to be united, and projects from the disk on the fabric-receiving side of the pin-carrying dial and occupies a position above the path of movement of the sewing needle and, below that, of the looper, whereby (through the cooperation of the chaining finger and these needles during the sewing operation) stitches may be formed around the finger and discharged from the free end thereof as such stitches are successively formed. These stitches may be produced with or without the presence of the fabric at the sewing-point.

The stitch-forming mechanism, above described, may be of any other type than that herein disclosed, and I merely reveal the same herein for illustrative purposes.

*Operation.*—The operation of the machine, as above described, is as follows: Power having been applied to the main driving-shaft 8, the pin-carrying dial 6 (with its looper-sustaining points 7) is continuously advanced in the direction indicated by the arrow in Fig. 1, and the sewing-needle 34 is operated under the influence of the crank 38 on the driving-shaft 8, while the looper 45 is operated under the influence of the eccentric 39. Each time that the shaft 8 makes one complete revolution, and while the pin-carrying dial 6 is continuously rotating successively to present each of its looper-sustaining pins at the sewing-point, the sewing-needle 34 is advanced about the axis of its shaft from the position shown in Fig. 5 to the position shown in Fig. 7, during which it will enter the groove 7b of one of the impaling-pins 7, then project through the two fabric-loops thereon, and then be extended to the position shown in Fig. 7, after which it is retracted therefrom to its starting position, which is somewhat back of that shown in Fig. 5, and during which it will be withdrawn from the loops, the latter in the meantime having been sewn together. The needle 34 and the looper 45 are so positioned and operated in respect to each other that the pointed portion of the needle 34 describes an arc from a fixed center or the axis of the shaft 31, while the pointed portion of the looper likewise describes an arc from a fixed center or the axis of the pintle 43; the pointed portion of the needle 34 swinging downwardly and through the loops Y and Z of the fabric and thence upwardly to a position above the same, with the stitch-receiving or chaining finger 46 occupying a plane above the impaling-pins; and the pointed portion of the looper 45 and the part thereof which receives the needle-thread from the needle moves in a path below the higher positions reached by the needle-eye and above the fabric and chaining-finger; the looper-eye, during its movement, crossing the path of the needle-eye on each side of the fabric or line of sewing during the sewing operation, which may, in general, involve the following:

Starting with the needle 34 in its retracted position, as shown in Fig. 5, and the looper in its forward position, as also shown in that figure, the needle-thread extends from a previously formed stitch, first to form a loop on one side of the fabric-loops and extend around the body of the looper 45 and, thence, (through the fabric with the needle-eye on the other side thereof) to the tension and take-up devices, designated, generally, by the reference-characters 47 and 48; while the looper-thread extends from a previously-formed stitch, through the loop already formed by the needle-thread, to and through the eye of the looper and then back through the loop of the needle-thread to the tension and take-up devices—all as described in the aforementioned Patent No. 1,069,336. Thus, the stitches are successively formed, the looper taking a loop of needle-thread on one side of the fabric, and the needle taking a loop of the looper-thread on the other side of the fabric, the loop of the looper-thread extending above the edges of the loops Y and Z of the fabric and engaging the loop of the needle-thread on one side of the fabric, and the loop of the needle-thread extending through the loops Y and Z and engaging the loop of the looper-thread on the opposite side of the fabric.

During this sewing operation, the stitches are not only formed around the series of the loops Y and Z then on a particular group of loop-carrying pins whereon they are united; but these stitches are also formed around the stitch-receiving member or chaining-finger which is located directly over these loops Y and Z and beneath the path of movement of the looper 45; and, as rapidly as the stitches are formed and the fabric is advanced by the dial, the stitches are discharged from the free end of the chaining-finger. Whether fabric loops are on the points or not, the stitches will be formed around the chaining-finger, thereby not only preventing interruption of the sewing-operation which might otherwise occur by reason of the absence of fabric, but also serving to effect the additional function of holding the sewing-needle in proper relation to each loop-sustaining point as the same is brought into the field of activity of the sewing-mechanism.

It will be understood that during the sewing-operation, the looper 45 moves in a path entirely above the loops Y and Z of the fabric—or, in other words, in a path entirely outside of a plane extending at right-angles to the loops—and that it never moves below the top of the loops; hence, the looper is permitted to take the needle-thread, and the sewing-needle is permitted to take the looper-thread.

While the sewing operation is being accomplished, and during the entire cycle of movement of the sewing-needle and looper, as above described, the pin-carrying dial (with the fabric sustained thereby) continues to move constantly and steadily so as to position, successively, each loop-carrying pin for action thereon of the stitch-formation mechanism whereby each set of two fabric-loops is united.

During this action of the parts, the sewing-needle will first position its point or portion beyond its eye in the groove of the loop-carrying pin and, as it continues its movement from the position shown in Fig. 5 toward the position shown in Fig. 7, the relative movement between the sewing-needle and the grooved pin—due to the fact that the loop-carrying pin is progressing transversely of and away from the pin-engaging portion of the sewing-needle—continues, and this needle is, by the pin (in whose groove the needle-point is engaged) guided toward and underneath the lower surfaces of the two impaled loops and, thence, through these loops, after which (as it continues its movement toward the position indicated in Fig. 7) the progressive lateral movement of the impaling-point away from the pin-engaging position would ordinarily effect a displacement of, or break the relation between, the needle and the groove in the impaling-point. But, by reason of the presence of the impaled loops on the loop-sustaining point, and the fact that these loops are relatively taut, the sewing-needle is temporarily deformed gradually from its outer point toward its base; that is to say, a bending of the needle is effected, this result being due to the fact that it is held against or close to the impaling-pin by the loops impaled on the pin, notwithstanding the fact that this pin is continuously progressing away from the normal line of reciprocatory movement of the needle. In consequence, the required relation between the needle and the impaling-point—necessary for the proper coaction between these two instrumentalities—is maintained, the fabric (strictly speaking, the loops of the fabric) functioning to hold the needle in proper relation with respect to the point and, to that end, bending the needle to an appreciable degree, as graphically illustrated in Figs. 5 to 9, inclusive. Thus, it will be seen that, although the relation between the continuously-moving impaling-points and the reciprocating sewing-needle is constantly changing—the impaling-point gradually moving away from the line of normal reciprocatory travel of the needle—nevertheless, no substantial separation of the engageable portion of the sewing-needle from the impaling-point thereby results. On the contrary, the coactive relation between the needle and the point is maintained until the needle has been so far retracted in its movement in respect to the point that it will have been withdrawn from the loops after these have been sewed together.

In other words, in a standard "Hepworth looper", as disclosed in United States Patent No. 1.069,367, dated August 5, 1913, to Zellers et al, say, with a 22-point dial, the pin-carrying dial travels approximately .0045 of an inch while the sewing-needle is engaged with one of the loop-sustaining pins or points. Now, when the sewing-needle is in action, its pin-engaging portion—during the reciprocatory movement of the needle—advances forward, in the general direction indicated by the arrow N (Figs. 5 and 12, and meets the fabric-stitches or loops $y$ and $z$ approximately at the midway-point of the impaling-pin; then it passes through the fabric-loops and, thereafter—because its movement is in the arc of a circle—rises slightly away from the impaling-pin. The dial will, as aforementioned, have moved .0045 of an inch while the needle was thus in engagement with it and will thereafter continue to progress, of course, in its rotary movement to the same extent. While the needle is moving forward in engagement with the grooved pin and through the impaled loops, it naturally engages the loops and, being more or less flexible and the loops being drawn more or less taut about the impaling-pins, the needle flexes or bends while the loops yield or stretch somewhat but not so much as to prevent them from bending the needle. The flexure or bend in the needle will be substantially equal to the extent of movement of the dial while the needle is engaged with loops, though the particular location of the bend will change as the needle moves into and out of the impaled loops, as shown in Figs. 5, 6, 7 and 8. As soon as the needle is released from the loops, it will spring or flip back to its normally unflexed condition and, thus, re-position itself to register with the next succeeding impaling-point and impaled loops. It will be understood that the dimensional data herein specified is approximated, and that, for other gages of dial-points, the dimensions would be in proportion.

On first consideration, it might seem that, theoretically at least, the operation just described would not occur nor result in the functions set forth; but in actual practice that is precisely what I have observed and with the result that the fabric—in this instance the set of impaled loops—functions as a needle-holding or positioning instrumentality, such that it maintains, or aids in maintaining, the proper coacting relation between the needle and the impaling-point on which are the loops that are to be united. The operation and resultant functioning of the parts just described occur in connection with each impaling-point as the same is brought into the line of reciprocatory movement of the sewing-needle.

*Modified structures.*—In lieu of depending upon the deformation, flexing, or bending of the needle or needle-point, in the manner already described—either by the impaled loops of the fabric or by the sewing-stitches formed to sew the loops together—I may mount the sewing-needle in its support so that it will have a restricted swinging movement on a substantially vertical axis: In other words, as shown in Figs. 11 and 12, the arm 33 of the two-arm member 32 is provided with swinging-arm 52 controlled by a spring 53 and in which the sewing-needle is mounted. To restrict the movement of the swinging-arm 52 in one direction, a limit stop 54 is mounted on a projection of the arm 33 and in the path of the needle so that it can swing only to a limited extent. When the point of the needle engages in the groove of the impaling-point, and as stress is developed in the needle by reason of the continuing travel of the loops on the point away from it, the arm 52 swings on its axis and permits the outer extremity of the needle to swing without bending the needle but in a manner to insure the requisite continued coactive relation between the engaging point of the needle and the groove of the impaling-point.

Thus, I have provided instrumentalities by which the needle is either deformed—as by flexing or bending the same—or swung so that its outer end maintains its coactive relation with the groove of the point without changing its condition—as by placing the same under tension—as contemplated and explained in the above-described structure.

What I claim is:

1. A machine for sewing looped fabrics comprising a base, an impaling-pin-support provided with impaling-pins projecting therefrom to receive the loops of the fabric to be united, stitch-forming mechanism mounted on the base and including a reciprocating deformable needle, means for effecting a continuous relative feeding-movement between the support and the needle and laterally of the impaling-pins and angularly to the path of, and in synchronism with, the reciprocations of the needle, each impaling-pin having a groove acting to receive and deform the needle upon its penetrating-stroke while being guided thereby through the loops of the fabric on the impaling pin at the time opposite the needle, and means for mounting the needle against a shifting movement, bodily, while being deformed.

2. In a machine for uniting edges of fabric and the like, a rotary pin-carrying dial, a series of loop-impaling pins radially disposed thereon and each provided with a needle-guiding groove, a thread-needle associated with the dial and having a reciprocatory movement in respect to each pin to penetrate loops impaled thereon and deformable so as to coact with the groove while within loops impaled thereon, means for effecting continuous rotation of the dial, first to position each of its pins successively to the needle and, then, beyond such needle and in a direction angular to the path of its reciprocations whereby to deform the same temporarily so that it will thereafter effect its own displacement from the groove, and means for mounting the needle against a bodily shifting movement while being deformed and displaced.

3. In a machine for uniting edges of fabric and the like, a rotary pin-carrying dial, a series of loop-impaling pins radially disposed thereon and each provided with a needle-guiding groove encompassed by fabric stitches, a thread-needle for forming sewing-stitches associated with the dial and having a reciprocatory movement in respect to each pin to penetrate fabric stitches impaled thereon and deformable for coaction with the groove while within the stitches impaled thereon, means for effecting continuous rotation of the dial, first to position the pins successively to the needle and then, beyond such needle and in a direction angular to the path of its reciprocations whereby to deform the same temporarily so that it will thereafter effect its own displacement from the groove, and means for mounting the needle against a bodily shifting movement while being deformed and displaced, the aforementioned stitches effecting a holding action on the needle to maintain it related to the groove.

4. In a machine for uniting edges of fabric and the like, a rotary pin-carrying member, a series of stitch-impaling pins radially disposed thereon and each provided with an elongated needle-guiding groove, a thread-needle associated with the dial and having a reciprocatory movement in relation to each pin to locate a sewing-thread in respect thereto and to penetrate and remain in the stitches encompassing each grooved pin while the stitching of the loops is being effected, means for effecting continuous rotation of the member, first to position the pins successively to the needle and, then, beyond such needle and in a direction angular to the path of its reciprocations whereby to swing the outer extremity thereof so as to flex the needle in relation to the groove while such needle is in the loops, such flexing being effected by yarn either of the fabric or of the needle, or of both, and means for mounting the needle against transverse bodily movement while being flexed and displaced.

5. In a machine for uniting or sewing looped fabrics, a supporting-member, a rotatable ring of impaling-pins thereon, a loop-forming device associated therewith and including a flexible-deformable needle disposed to permit a swinging of its outer portion while successively engageable with each of the impaling-pins, means for mounting the needle against sidewise bodily movement, a looper, and means for continuously rotating the pin-carrying ring and in synchronism to the reciprocations of the needle for positioning its pins in relation to the needle and in needle-engaging position and, then, continuing such movement of the pins in a direction angular to the path of reciprocations of the needle and thereby effect independent of the looper temporary deformation of the needle to tension the same whereby as the ring continues its rotary movement and disengages the needle, the latter automatically positions itself for engagement with the succeeding pin.

6. A machine for uniting adjacent edges of looped fabric, including a rotatable pin-carrying member, a series of loop-sustaining elements thereon and each provided with a needle-guiding groove, sewing-mechanism associated therewith and comprising a flexing needle reciprocable in a fixed path and in respect to each loop-sustaining element and adapted to be flexed in respect to the groove therein, means operating in timed relation to the reciprocations of the needle for moving the loop-sustaining elements in a direction angular to the path of such reciprocations of the needle and, while the latter is in coacting relation to each of such elements, flexing such needle, the flexing of the needle being controlled by the article being sewed and independently of the sewing-mechanism, and means for mounting the flexing needle against sidewise bodily movement.

7. A machine for uniting adjacent edges of looped fabric, including a rotatable pin-carrying member, a series of loop-sustaining elements thereon and each provided with a needle-guiding groove, sewing-mechanism associated therewith and comprising a flexing needle reciprocable in a fixed path and in respect to each loop-sustaining element and adapted to be flexed in respect to the groove therein, means operating in timed relation to the reciprocations of the needle for moving the loop-sustaining elements in a direction angular to the path of such reciprocations of the needle and, while the latter is in coacting relation to each of such elements, flexing such needle, the flexing of the needle being automatically controlled by the article being sewed to maintain the needle in coacting relation to the groove in the element for the edge-uniting operation, and means for mounting the needle to maintain it against sidewise bodily movement while being flexed.

8. A machine for uniting edges of looped fabric including a continuously-rotating pin-carrying member, a series of pins carried thereby and each provided with a needle-guiding groove, stitch-forming mechanism associated with the member and comprising a sewing-needle having a predetermined reciprocating movement in relation to each pin and being flexed while coacting with the groove in the pin, means for effecting continuous movement of the pins in synchronism to the reciprocations of the needle and in a direction angular to the path of such reciprocations to effect said flexing of the needle, at least a part of such flexing being controlled by the loops of the article being stitched, means for mounting the needle to maintain it against sidewise bodily movement while being flexed and means for actuating the pin-carrying member in timed relation to the reciprocating movement of the needle and its action in the groove.

In testimony whereof I affix my signature.

JOHN BUCKREUS.